United States Patent
Saltel

(10) Patent No.: US 7,828,054 B2
(45) Date of Patent: Nov. 9, 2010

(54) PACKER CABLE SEALING SYSTEM

(75) Inventor: Jean-Louis Saltel, Le Rheu (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 230 days.

(21) Appl. No.: 11/675,201

(22) Filed: Feb. 15, 2007

(65) Prior Publication Data

US 2007/0227724 A1 Oct. 4, 2007

Related U.S. Application Data

(63) Continuation-in-part of application No. 10/561,306, filed as application No. PCT/EP2004/006240 on Jun. 8, 2004, now abandoned.

(51) Int. Cl.
*E21B 33/127* (2006.01)

(52) U.S. Cl. .................. 166/187; 277/331; 277/334

(58) Field of Classification Search .......... 166/187; 277/334, 331, 340, 341; 138/93, 97, 98; 405/259.3

See application file for complete search history.

(56) References Cited

U.S. PATENT DOCUMENTS

| 4,467,835 A * | 8/1984 | Champleboux ............ 138/93 |
| 5,702,109 A | 12/1997 | Blin et al. |
| 5,778,982 A | 7/1998 | Baski et al. |
| 2003/0131988 A1 * | 7/2003 | Wilson et al. ............ 166/187 |

FOREIGN PATENT DOCUMENTS

| GB | 2275066 | 8/1994 |
| WO | WO9312322 | 6/1993 |
| WO | WO2005003617 | 1/2005 |

* cited by examiner

*Primary Examiner*—Kenneth Thompson
*Assistant Examiner*—Sean D Andrish
(74) *Attorney, Agent, or Firm*—Myron K. Stout

(57) ABSTRACT

A packer for temporarily closing a well or a pipe including a support and an inflatable tubular element attached to the support, the element having a wall of elastic material that is deformable radially outwards under the action of internal pressure so as to press hermetically against the wall of the well or pipe and is reinforced with multistrand metal cables embedded in the wall of the material, wherein the spaces between the strands forming the metal cables contain a fluid impermeable material so that fluid is unable to flow through the spaces of the cables.

6 Claims, 1 Drawing Sheet

PACKER CABLE SEALING SYSTEM

This application is a continuation-in-part of prior U.S. application Ser. No. 10/561,306, filed Jan. 24, 2007, now abandoned which is the national stage of international application no. PCT/EP2004/006240 filed 8 Jun. 2004.

TECHNICAL FIELD

This invention relates to a packer for temporarily closing a well, in particular, an oil or gas well or pipe.

BACKGROUND ART

Packers are used to temporarily separate two contiguous portions of a well or pipe from each other, for example in order to perform investigations or repairs in one of the portions.

One common type of packer an inflatable packer. Inflatable packers comprises an inflatable element carried by a support for inserting in the well or the pipe, the inflatable element being tubular having a circular section and having a wall that is leakproof, flexible and elastic, and deformable radially outwards under the action of the pressure of an internal fluid so as to bear hermetically against the wall of the well or the pipe to isolate one area of the well from another.

At rest, the diameter of the device and of the inflatable element is less than the diameter of the well or pipe. Once the packer has been positioned in the desired zone, the inflatable element is inflated by pumping in a liquid into the element, in particular water, a hydrocarbon, and/or the mud present inside the well or pipe. The fluid is raised to a high pressure, suitable for causing the inflatable element to expand and for pressing it firmly against the wall of the zone in question so as to close it hermetically in a temporary manner, isolating one portion of the borehole from the other. This prevents fluid flowing from between the two zones.

Once the investigation and/or repair operations have been completed, the inflatable element is deflated and the device is withdrawn. The packer can then be used again for closing a new zone of the same well or pipe, or it can be transferred to another site into a new well in order to perform the same function.

In an oil field application the inflatable element is generally about 1 m to 4 m long, with an initial outside diameter (i.e. when inflated) in the range of about 70 mm to 150 mm, and with a wall thickness (when not inflated) in the range of about 15 mm to 25 mm. The inflatable element is generally formed from a natural or synthetic elastomeric material such as rubber.

Appropriate installation of the inflatable element requires a relatively high internal pressure to be used to inflate the packer, for example about 30 megapascals (MPa) to 40 MPa. Therefore during inflation, the wall of the inflatable element is exposed to very large forces. The pressure difference between the inside and outside of the packer is very large and can go beyond the ability of the inflatable element to withstand, resulting in the packer expanding enormously and which can cause damage to the inflatable element, or even cause it to explode. Because of this the material forming the inflatable element is reinforced, often mechanically. WO93/12322 and WO2005003617 describe packers having mechanically reinforced inflatable element.

Generally wire-like reinforcing elements are used, such as at least one sheet of flexible strands, e.g. steel wires, embedded in the wall of the inflatable element, the sheet having a circularly cylindrical surface on the same axis as the inflatable element. It is also known to use a pair of concentric reinforcing sheets, each made up of a series of parallel flexible wires (or cables), e.g. made of steel, wound helically at a long pitch (i.e. at a small angle of inclination relative to the longitudinal axis of the device), the wires in the two layers having angles of inclination of similar size but of opposite directions. In a non-inflated inflatable element, the angle of inclination is initially about 15°, as the inflatable element is inflated the angle increases and reaches a final value of about 35° to 40°. In other packer devices, at least one similar third sheet (an auxiliary sheet) is provided disposed coaxially inside the other two sheets and is made of wires that are finer and closer together than the wires of the outer (main) sheets. The function of the auxiliary sheet is to oppose a phenomenon known as "extrusion" which is associated with the material constituting the wall of the inflatable element creeping outwards under the action of very high internal pressure, which runs the risk of forming a hernia passing through the gaps between certain reinforcing wires of the main sheets, and leading to the wall rupturing. This technique is relatively satisfactory, but does not completely eliminate the risk of the material being extruded or the corresponding risk of the inflatable element deteriorating.

This problem is resolved by providing a packer that includes at least one fiber layer, referred to as a "filter" layer which is circularly cylindrical in shape and disposed concentrically, being embedded in the wall of the material forming the inflatable element, inside relative to the sheets of flexible strands. The filter layer has a structure that acts as an anti-extrusion barrier, to limit creep of the material constituting the wall of the inflatable element and to prevent the material from passing outwards between the reinforcing strands under the effect of the pressure generated by the inflation fluid.

Current packers generally aim to minimize the risk of the inflatable element suffering from extrusion, splitting and concomitant rupturing. However these mechanical reinforcements for the packers do not completely prevent damage to the inflatable elements and in addition boreholes can have rough surfaces and the inflatable elements can also be damaged during their insertion into the well.

When damage occurs to the packer such as cracks in the material of the inflatable element this can create a path for the fluid to flow through the cables that are reinforcing the inflatable element, affecting the seal the packer is meant to create. If the pressure above the packer is greater than the pressure below the packer, fluid in the borehole can flow from above the packer to below the packer by migrating through the path created by the spaces in the steel cables, resulting in a leak between the top and bottom of the packers.

Therefore it is an object of the invention to provide a packer that will reduce the risk of fluid leaking if the material of the inflatable element is damaged. In particular a packer is provided where the spaces of the cables embedded in the elastic material forming the inflatable element are filled with a material to prevent fluid flow through the inflatable element of the packer when it is damaged.

DISCLOSURE OF THE INVENTION

Accordingly a first embodiment of the invention is a packer for temporarily closing a well or a pipe comprising a support; and an inflatable tubular element attached to the support; the inflatable element having a wall of elastic material that is deformable radially outwards under the action of internal pressure so as to press hermetically against the wall of the well or pipe, and is reinforced with metal multistrand cables embedded in the wall of the material; wherein the spaces between the strands forming the metal cables are filled with a fluid impermeable material so that fluid is unable to flow through the spaces in the cables. Filling the spaces of each of the cables embedded in the material of the inflatable element blocks a passageway that fluid can flow through if the inflatable element is damaged.

Preferably the spaces are filled with a second elastic material.

The preferred first elastic material and fluid impermeable material is an elastomer. Using an elastic material as the filler for the spaces allows the cables to maintain their flexibility.

Preferably the metal cables are steel cables. Sheets of the flexible cables can be formed which are embedded in the wall of the inflatable element, occupying a circularly cylindrical surface in the same axis as the inflatable element.

A second embodiment of the invention comprises a method for making a packer for temporarily closing a well or pipe as described above comprising filling the spaces between the strands of the multistrand cables with a fluid impermeable material; and then embedding the cables into a first elastic material to form a reinforced inflatable element for a packer.

Preferably the method comprises injecting a second elastic material as the fluid impermeable material into the cable spaces and allowing the elastic material to set.

MODE(S) FOR CARRYING OUT THE INVENTION

Figure 1:
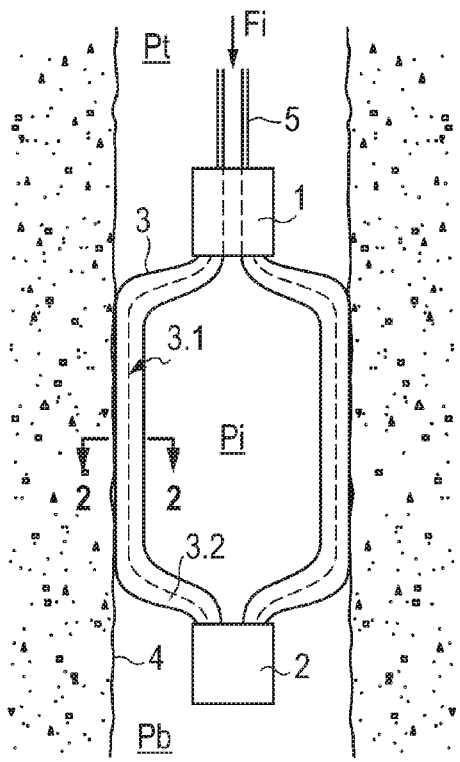
FIG. 1 shows a schematic of an inflatable packer assembly down a borehole.

In FIG. 1 a packer device comprises a support comprising a pair of end washers 1, 2 having a sleeve-shaped inflatable element 3 disposed between them, the inflatable element being circular in section. The packer can be run down an openhole or cased well on wireline, pipe or coiled tubing.

The sleeve-shaped inflatable element 3 is made of composite material comprising steel cables 3.1 as the mechanical reinforcement embedded in a matrix of flexible and elastically deformable material, e.g. an elastomer 3.2. The end portions of the inflatable element are fixed in leaktight manner to the washers 1 and 2 which close the ends of the inflatable element.

Conventional means (not shown) serve firstly to move the packer inside the borehole 4 so as to position it within the zone that is to be closed off and secondly to introduce a fluid, in particular a liquid, under high pressure to the inside of the inflatable element 3 via a channel 5 that is pierced for this purpose through one of the washers.

Fluid (symbolized by arrow $F_i$) is introduced under high pressure to the inside of the inflatable element 3 via a channel 5 that runs through one of the washers 1. The pressure Pi caused by the introduction of the liquid has the effect of expanding the inflatable element 3 radially outward so that it presses firmly against the inside wall of the borehole 4. This provides the looked for closure. When the pressure Pt above the packer is greater than pressure Pb below the packer and when pressure Pi inside the packer is greater than pressure Pb then the packer will seal the borehole. During the radial expansion, the length of the inflatable element can shorten as the two end washers 1, 2 move towards each other and simultaneously the thickness of the inflatable element can become smaller. The initial diameter of the inflatable element increases and its diameter after inflation is about 1.5× to about 2× the initial diameter.

Variants of the packer device (not shown) can also include a central tubular mandrel which carries the end washers, between which the inflatable element is mounted. The inflation fluid is introduced into the mandrel and penetrates into the inside if the inflatable element via radial holes formed through the wall of the mandrel. The end washers are mounted to slide in a leaktight manner on the mandrel so as to adapt to the axial shortening of the inflatable element while it is being inflated.

Figure 2:
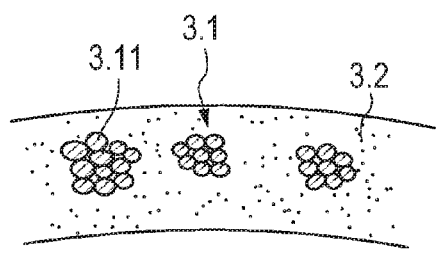
FIGS. 2 and 3 shows steel cables embedded in an elastic material of an inflatable element.
Figure 3:
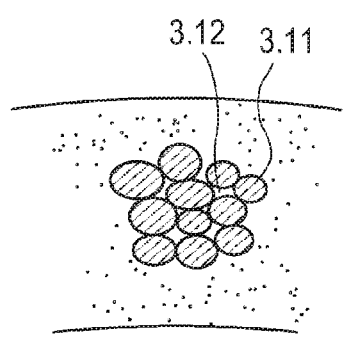

FIGS. 2 and 3 are cross-sectional views of the inflatable element 3 taken along line 2-2. The wall of the inflatable element is reinforced with multistrand steel cables 3.1 embedded in the elastomer 3.2 material as shown in FIGS. 2 and 3. The cables 3.1 are made of a number of strands 3.11. When the strands 3.11 are bundled together to make the cable, spaces 3.12 occur between the individual strands forming the cable.

Figure 4:
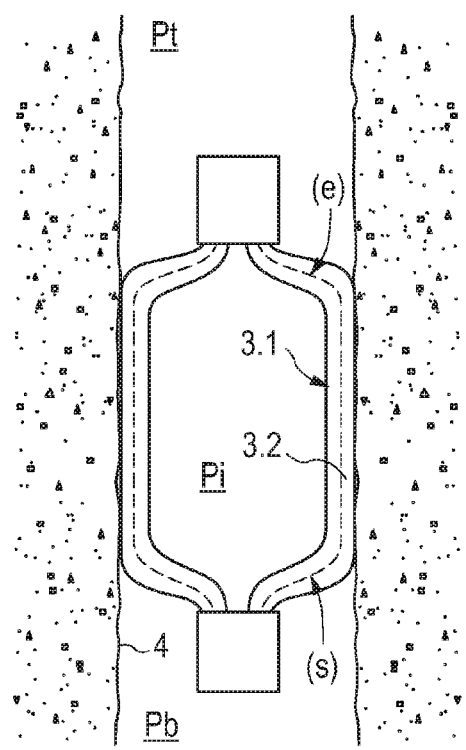
FIG. 4 shows the path of fluid through an inflatable packer assembly when the inflatable element is damaged.

When the elastic material forming the sleeve is damaged as shown in FIG. 4 this can create openings in the material through which fluid can flow into and out of the packer inflatable element. If the pressure Pt is greater than pressure Pb, fluid in the borehole 4 can migrate from the top of the packer, entering where the elastomer 3.2 is damaged (e), to the bottom of the packer exiting where the elastomer is further damaged (s) at the bottom of the packer using the spaces in the cables 3.1, as a passageway to flow through the packer. This damage affects the integrity of the seal of the packer, due to the leakage that occurs.

Figure 5:
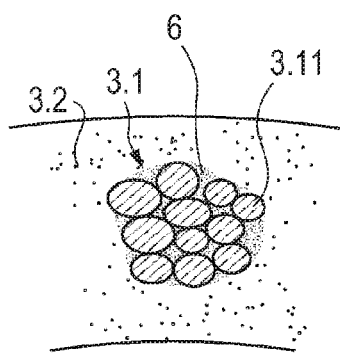
FIG. 5 shows the space filled multistrand cables embedded in an elastic material of an inflatable element.

With reference to FIG. 5, according to the invention to prevent fluid flowing through the cables 3.1 when the elastomer 3.2 is damaged the spaces between the strands 3.11 forming the cable 3.1 are filled with an elastic material 6, such as an elastomer. The elastic material is impermeable to fluid and therefore even if the elastic material of the sleeve is damaged the path through which the fluid can flow through the cable is blocked by the elastic material 6 set in the spaces of the cable and the integrity of the packer is maintained. Stopping fluid flowing through the cables, allows the seal between the top of the packer and the bottom of the packer to be maintained as there is no risk of a leak occurring between the top and bottom of the packer even when the elastic material forming the inflatable element is damaged.

The elastic material, such as an elastomer, is injected into the spaces of the cable before the packer itself is made. When the elastic material is set the cables can then be used to manufacture a reinforced inflatable element for a packer.

Changes may be made while still remaining within the scope of the invention.

The invention claimed is:

1. A packer for temporarily closing a well or a pipe, comprising:
   a support; and
   an inflatable tubular element attached to the support, the element having a wall of a first elastic material that is deformable radially outwards under the action of internal pressure so as to press hermetically against the wall of the well or pipe and being reinforced with metal strands bundled together to form cables embedded in the wall of the material;
   wherein any spaces between the metal strands forming the bundled cables contains a fluid-impermeable material so that fluid is unable to flow through the spaces of the bundled cables, the fluid impermeable material being separate from the packer and injected into the spaces of the bundled cables before the packer is made.

2. A packer according to claim 1 wherein the fluid-impermeable material is a second elastic material.

3. A packer according to claim 1 wherein the first elastic material and the fluid-impermeable material are an elastomer.

4. A packer according to claim 1 wherein the metal cables are steel cables.

5. A method for making a packer for temporarily closing a well or a pipe as claimed in claim 1, comprising:
- injecting a fluid impermeable material into the spaces between the strands of the multistrand cables, and
- embedding the cables into the first elastic material to form the reinforced element for the packer.

6. A method according to claim 5, comprising injecting a second elastic material as the fluid-impermeable material into the cable spaces and allowing the second elastic material to set.

* * * * *